Patented Oct. 23, 1934

1,977,652

UNITED STATES PATENT OFFICE 1,977,652

MANUFACTURE OF RESINS FOR LACQUERS, VARNISHES, AND THE LIKE

Norman Strafford and Eric Everard Walker, Blackley, Manchester, England, assignors to Imperial Chemical Industries Limited, London, England No Drawing. Application February 14, 1929, Serial No. 340,009. In Great Britain February 15, 1928

4 Claims. (Cl. 134—26)

Phenol-aldehyde resins of the thermo-hardening type are often used in the manufacture of stoving lacquers. The complete insolubility, the chemical inertness and infusibility of the fully hardened film renders this type of lacquer valuable for many purposes. On the other hand the hardened film suffers from several disadvantages. It is brittle and inelastic, and its adhesion to smooth metal, glass and porcelain surfaces is poor so that it easily cracks or peels away from such surfaces. The ordinary phenol-formaldehyde resin film shrinks considerably during hardening and may even crack away from its support on account of this shrinkage alone. The film hardens slowly at temperatures below 100° or 120° C. and generally darkens considerably during hardening. When the attempt is made to overcome these defects by the addition of ordinary plasticizers it is found that hardening is seriously retarded; moreover, since these plasticisers are usually of the high-boiling solvent type, they are gradually lost from the film, especially by prolonged exposure to moderate degrees of heat, and the film becomes brittle.

The object of this invention is in the production of resins suitable for the manufacture of lacquers which will harden rapidly at temperatures of 100° C. or less to form non-brittle, permanently flexible films, which adhere strongly to metallic and other smooth surfaces and which do not shrink or darken appreciably during hardening. The lacquers produced according to this invention may possess any or all of these properties in varying degrees, according to the composition and exact method of manufacture.

To achieve this object, we add a non-volatile plasticiser a resin of the polyhydric alcohol-polybasic acid type, and we have made the surprising discovery that, unlike all other plasticisers hitherto tried, polyhydric alcohol-polybasic acid resins even when used in very large proportions do not appreciably retard the hardening of phenol-formaldehyde resoles. By the term "resole" we mean the product obtained by the condensation of phenols with formaldehyde in the presence of alkalies, the said product being an intermediate condensation product which is fusible and which is capable, under suitable conditions, of being converted into an insoluble and infusible resin.

We have found that, in order to obtain films possessing a high degree of flexibility and toughness it is necessary to employ polyhydric alcohol-polybasic acid resins which have been modified by the incorporation of fatty acids such as stearic, oleic acid, the acids of linseed oil and China-wood oil, or of oils such as linseed oil or castor oil. If, however, a lacquer is made by dissolving a modified polyhydric alcohol-polybasic acid resin of this type together with an ordinary phenol-formaldehyde resole in a common solvent, a film may be obtained which becomes non-homogeneous and cloudy during hardening. Moreover, such lacquers do not harden rapidly at moderate temperatures, but require baking at 100° C. or higher temperatures.

In order to overcome this lack of homogeneity and this slowness of hardening, we use, according to our invention, instead of an ordinary phenol-formaldehyde resole, a purified resole such as that described in our copending applications Ser. Nos. 289,610 and 289,611. In this process the free phenol and condensation products of low molecular weight are extracted by means of a solvent, such as water, in which the condensation product itself is insoluble. Such purified resoles readily form clear, transparent, rapidly-hardening films under conditions which would lead to the formation of cloudy films hardening relatively slowly if unpurified resoles were employed.

This method of manufacture gives clear films, for example, in the case of polyhydric alcohol-polybasic acid resins modified with castor oil or with stearic acid, oleic acid or drying oil acids (e. g. from linseed oil or China-wood oil). Any slight tendency to cloudiness, e. g., in thick films, may be counteracted by the addition of a little acid catalyst or of a drier such as cobalt linoleate. Except in the case of polyhydric alcohol-polybasic acid resins containing the fatty acids of China-wood oil, this addition of acid accelerates the rate of hardening, and if sufficient acid catalyst is added, hardening will take place at ordinary temperatures.

It is known already that polyhydric alcohol-polybasic acid resins modified by drying oil fatty acids may be hardened by baking at moderate temperatures, but by means of our invention films may be obtained which, after baking for 1½ to 3 hours at 80° C. are harder and more resistant to solvents than are films made from drying oil fatty acid polyhydric alcohol-polybasic acid resins baked for a similar length of time. In our invention we are not limited to the use of polyhydric alcohol-polybasic acid resins containing drying oil fatty acids. We may use polyhydric alcohol-polybasic acid resins containing only fatty acids possessing in themselves no drying properties or the acids of semi-drying oils.

By the term "oil modified polyhydric alcohol-polybasic acid resin", as used herein, we mean the reaction product of a polyhydric alcohol, a polybasic acid, and one or more oils and/or oil acids, such as stearic acid, oleic acid, linseed oil acids, China-wood oil acids, linseed oil and castor oil.

It is not contended that, by the use of a purified phenol-formaldehyde resole in the presence or absence of an acid catalyst or a drier, clear transparent flexible films can be obtained without the exercise of judgment and care, since cloudy films may be obtained notwithstanding, if the quantity of phenol-aldehyde resole used is very high (say more than 50 per cent of the total weight of resin) or if the proportion of fatty acid or oil in the polyhydric alcohol-polybasic acid resin is too high. Nevertheless, it is possible, by means of this invention, to obtain a combination of rapidity of hardening, transparency, flexibility and toughness which cannot otherwise be obtained with these classes of resins.

That opalescence is really due to the presence of free phenol and phenol-aldehyde condensation products of low molecular weight can be demonstrated quite easily. If for example 5 parts of free phenol are added to 100 parts of the mixed resins specified in Example 1 the hardened coat is opalescent and soft.

A similar result is obtained if phenol-aldehyde condensation products of low molecular weight are added instead of free phenol.

In the phenol-aldehyde resole we may substitute cresols or other phenolic substances for phenol itself, provided always that the condensation product is of the thermo-hardening type; and for formaldehyde we may substitute furfural if colour is unimportant; but we prefer to use resoles made from phenol itself, or from cresols containing a high proportion of m-cresol, and formaldehyde (or its equivalent, e. g. hexamethylenetetramine) as these, in combination with a polyhydric alcohol-polybasic acid resin, give rapidly hardening films.

The thermo-hardening resins made according to this invention are particularly suitable for use as lacquers capable of being hardened rapidly at relatively low temperatures, but they may be used also for moulding powders and laminated products when quick-hardening and flexible non-brittle products are required. The lacquers containing acid catalysts are particularly suitable for coating wooden articles on account of the low temperature at which they harden, the durability and light colour of the film produced, and the excellent finish which can be obtained with one or two coats.

Our invention is illustrated but not limited by the following examples, in which the parts are by weight:

EXAMPLE 1

(a) *Preparation of a polyhydric alcohol-polybasic acid resin modified with linseed oil fatty acids*

Phthalic anhydride (184 parts) glycerol (92 parts) and linseed oil fatty acids (108 parts), are heated together for about 40 minutes at 180–190° C. The reaction is accompanied by evolution of water. The temperature may conveniently now be increased to 220–230° C. for about three quarters of an hour. The heating is then discontinued and the mixture cooled.

(b) *Preparation of lacquer*

A lacquer is prepared from the following constituents:—50 parts of the above linseed oil polyhydric alcohol-polybasic acid resin, 12.5 parts of fully purified phenol-formaldehyde resole (prepared according to our U. S. A. Specifications Serial Nos. 289,610 and 289,611) 48 parts of butyl acetate, 16 parts of ethyl acetate, 16 parts of butyl alcohol, 7 parts of ethyl alcohol.

The lacquer is applied by brushing, spraying, or dipping. Several consecutive coats may be applied before hardening, each coat being allowed to air-dry for an hour before applying the next. In order to harden the composite coating the lacquered article is stoved for 2–3 hours at a temperature of about 80° C. or for a shorter period at 100° C. The hardened coat is transparent, or if the coat is very thick it may appear faintly cloudy. It possesses a brilliant polish and is tough and flexible. On the application of a lacquer solvent such as employed in the preparation of nitro-cellulose lacquers it softens somewhat but remains smooth and does not lift or dissolve. By adding to the lacquer, before application, 1.6 parts of a 10 per cent solution of sulphuric acid in ethyl alcohol, it is possible to obtain a coat which after hardening under the specified conditions is quite transparent and is considerably firmer than that produced in the absence of acid. It is only slightly affected by lacquer solvent. If a lacquer is prepared as described in this example with the exception that ordinary commercial phenol-formaldehyde resole containing 7–10 per cent free phenol is used in place of the specially purified resole, the hardened coat produced by heating for the time specified is in many ways inferior. It is softer and exhibits a heavy opalescence which develops during the hardening, whilst on the application of lacquer solvent it becomes very sticky and partly dissolves.

EXAMPLE 2

(a) *Preparation of a polyhydric alcohol-polybasic acid resin modified with castor oil*

A mixture of phthalic anhydride (148 parts), glycerol (62 parts) and castor oil (110 parts) are melted together, and the temperature adjusted to 185–195° C. After 1 hour the temperature is raised to 220–230° C. The condensation proceeds with elimination of water, and loss of some phthalic anhydride, and the melt becomes progressively more viscous. When the melt has attained the required viscosity, the heating is interrupted, and the mixture cooled.

(b) *Preparation of lacquers*

A lacquer is prepared from the following:— 25 parts of the above castor oil polyhydric alcohol-polybasic acid resin, 25 parts of fully-purified phenol-formaldehyde resole, 36 parts of butyl acetate, 10 parts of ethyl acetate, 10 parts of butyl alcohol, 14 parts of ethyl alcohol.

To the lacquer is added, with stirring, 1.25 parts of a 10 per cent solution of sulphuric acid in ethyl alcohol. The lacquer is applied and hardened as in Example 1. The hardened coat is of brilliant polish and is free from opalescence. It is very hard, practically unaffected by lacquer solvent and is impervious to water. If the sulphuric acid is omitted from the lacquer the hardened coat appears transparent if thin, or faintly cloudy if thick. It is not quite so firm or so resistant to water. If in the preparation of the polyhydric alcohol-polybasic acid resin 60 parts of castor oil are employed in place of 110 parts, the coat from the lacquer is quite transparent even when hardened in the absence of the acid catalyst.

Example 3

To a lacquer prepared exactly as in Example 1 are added, with stirring, 5-6 parts of 20 per cent alcoholic sulphuric acid. The lacquer is applied in a warm dry atmosphere and each coat allowed to air-dry several hours before applying the next. No stoving is necessary. A glossy coat, which does not lift or dissolve on the application of lacquer solvent, is produced. The coating develops its full hardness after standing several days.

Example 4

(a) *Preparation of a polyhydric alcohol-polybasic acid resin modified with China-wood oil fatty acids*

A mixture of phthalic anhydride (92 parts), glycerol (46 parts) and China-wood oil acids (72 parts) are melted together, and the temperature maintained at 185-195° C. for ½ hour. The temperature is raised to 225° C. and the heating continued until the melt attains the desired viscosity; the mixture is then cooled. The resin must not be overheated, otherwise it will pass into an insoluble "gel-like" substance.

(b) *Preparation of lacquer*

A lacquer is prepared from this polyhydric alcohol-polybasic acid resin exactly as in Example 1. To the lacquer is added a quantity of cobalt drier (e. g. cobalt linoleate or tungate) containing 0.1-0.2 percent of cobalt, expressed on the China-wood oil content of the lacquer. The lacquer is applied and hardened as in Examples 1 and 2. The hardened composite coat is transparent and possesses a brilliant polish. It is firm, tough and flexible and is softened only slightly by lacquer solvent.

If the lacquer is hardened in the absence of cobalt drier the coat is faintly opalescent but otherwise practically the same as described above. If an acid catalyst (e. g. 1.6 parts of 10 per cent alcoholic sulphuric acid) is added to the lacquer in place of the cobalt drier, the hardened coat is transparent but is slightly tacky and is not quite so tough as those hardened in absence of the acid.

What we claim and desire to secure by Letters Patent is:—

1. A composition of matter comprising an oil modified polyhydric alcohol-polybasic acid resin and phenol-aldehyde resole, the said phenol-aldehyde resole having been substantially freed from unconverted phenol by extraction with a phenol solvent in which the resin itself is insoluble, and the resulting composition of matter being transparent.

2. A composition of matter comprising a water purified phenol-aldehyde resole and an oil modified polyhydric alcohol-polybasic acid resin, the resulting composition of matter being transparent.

3. A composition of matter comprising a purified phenol-aldehyde resole and a polyhydric alcohol-polybasic acid resin modified with a drying oil acid, the resulting composition of matter being transparent.

4. A composition of matter comprising a purified phenol-aldehyde resole and a polyhydric alcohol-polybasic acid resin modified with at least one fatty body selected from a group consisting of fatty acids, the acids of drying oils, linseed oil and castor oil, the resulting composition of matter being transparent.

NORMAN STRAFFORD.
ERIC EVERARD WALKER.